(12) United States Patent
Zhang

(10) Patent No.: US 11,667,824 B2
(45) Date of Patent: Jun. 6, 2023

(54) ADHESIVE AND ITS PREPARATION AND APPLICATION

(71) Applicant: Covestro Intellectual Property GmbH & Co. KG, Leverkusen (DE)

(72) Inventor: Chenxi Zhang, Shanghai (CN)

(73) Assignee: Covestro Intellectual Property GmbH & Co. KG, Leverkusen (DE)

(*) Notice: Subject to any disclaimer, the term of this patent is extended or adjusted under 35 U.S.C. 154(b) by 352 days.

(21) Appl. No.: 16/903,466

(22) Filed: Jun. 17, 2020

(65) Prior Publication Data

US 2020/0399512 A1 Dec. 24, 2020

(30) Foreign Application Priority Data

Jun. 19, 2019 (CN) .......................... 201910534464.3
Jul. 24, 2019 (EP) ..................................... 19187987

(51) Int. Cl.
| | | |
|---|---|---|
| C09J 175/08 | (2006.01) | |
| C09J 7/35 | (2018.01) | |
| B32B 7/12 | (2006.01) | |
| B32B 17/04 | (2006.01) | |
| C08G 18/12 | (2006.01) | |
| C08G 18/16 | (2006.01) | |
| C08G 18/32 | (2006.01) | |
| C08G 18/34 | (2006.01) | |
| C08G 18/48 | (2006.01) | |
| C08G 18/62 | (2006.01) | |
| C08G 18/76 | (2006.01) | |
| C08K 5/14 | (2006.01) | |
| C08K 5/5425 | (2006.01) | |
| C08K 7/14 | (2006.01) | |
| B29C 65/48 | (2006.01) | |
| B29C 65/00 | (2006.01) | |
| C08F 283/00 | (2006.01) | |
| C08G 18/67 | (2006.01) | |
| C08J 5/04 | (2006.01) | |
| C09J 175/16 | (2006.01) | |
| C09J 175/14 | (2006.01) | |
| C09J 11/06 | (2006.01) | |
| B29L 31/08 | (2006.01) | |

(52) U.S. Cl.
CPC ........... *C09J 175/08* (2013.01); *B29C 65/485* (2013.01); *B29C 66/7212* (2013.01); *B32B 7/12* (2013.01); *B32B 17/04* (2013.01); *C08F 283/006* (2013.01); *C08G 18/12* (2013.01); *C08G 18/166* (2013.01); *C08G 18/3215* (2013.01); *C08G 18/348* (2013.01); *C08G 18/48* (2013.01); *C08G 18/4829* (2013.01); *C08G 18/4883* (2013.01); *C08G 18/6229* (2013.01); *C08G 18/672* (2013.01); *C08G 18/7657* (2013.01); *C08G 18/7664* (2013.01); *C08J 5/043* (2013.01); *C08K 5/14* (2013.01); *C08K 5/5425* (2013.01); *C08K 7/14* (2013.01); *C09J 7/35* (2018.01); *C09J 11/06* (2013.01); *C09J 175/14* (2013.01); *C09J 175/16* (2013.01); *B29L 2031/082* (2013.01); *C08G 2190/00* (2013.01); *C09J 2475/00* (2013.01)

(58) Field of Classification Search
CPC ... C08F 283/006; C08G 18/12; C08G 18/166; C08G 18/3215; C08G 18/348; C08G 18/4883; C08G 18/6229; C08G 18/7657; C08G 18/4829; C08G 18/672; C08G 18/7664; C08G 18/48; C08G 2190/00; C08K 5/14; C08K 5/5425; C08K 7/14; C08J 5/043; C09J 175/08; C09J 7/35; C09J 175/16; C09J 175/14; C09J 11/06; C09J 2475/00; B32B 7/12; B32B 17/04; B29C 65/485; B29C 66/7212; B29L 2031/082
See application file for complete search history.

(56) References Cited

U.S. PATENT DOCUMENTS

| | | | |
|---|---|---|---|
| 6,136,880 A | * | 10/2000 | Snowwhite ........... C03C 25/106 428/383 |
| 7,931,970 B2 | | 4/2011 | Schlingloff et al. |
| 9,567,499 B2 | | 2/2017 | Thiele et al. |
| 2018/0051196 A1 | | 2/2018 | Thiele et al. |

FOREIGN PATENT DOCUMENTS

| | | |
|---|---|---|
| CN | 102079810 A | 6/2011 |
| CN | 101525439 B | 6/2012 |
| CN | 103540288 A | 1/2014 |
| CN | 104031597 A | 9/2014 |
| CN | 106634789 A | 5/2017 |
| KR | 20140085571 A | 7/2014 |

* cited by examiner

*Primary Examiner* — Patrick D Niland
(74) *Attorney, Agent, or Firm* — The Webb Law Firm

(57) ABSTRACT

The present invention relates to an adhesive, a preparation method and application thereof, particularly the application for bonding glass fiber composites, and a bonded article obtained by using the adhesive. The adhesive comprises: a polyisocyanate having an isocyanate functionality of not less than 2; an epoxy-modified polyether polyol; a hydroxyl-containing acrylate; a redox catalyst; a silane coupling agent; optionally a polyol containing bisphenol A structure; and optionally a polymer polyol different from the epoxy-modified polyether polyol. The adhesive according to the present invention has the advantages of being insensitive to moisture, good bonding properties and a long pot life.

13 Claims, No Drawings

ADHESIVE AND ITS PREPARATION AND APPLICATION

CROSS-REFERENCE TO RELATED APPLICATION

This application claims the benefit of European Application No. 19187987, filed Jul. 24, 2019, and Chinese Application No. 201910534464, filed Jun. 19, 2019, each of which is incorporated herein by reference.

TECHNICAL FIELD

The present invention relates to an adhesive, a preparation method and application thereof, particularly the application for bonding glass fiber composites, and a bonded article obtained by using the adhesive.

BACKGROUND

Polyurethane resin is a thermosetting polymer material having a high crosslinking density, and can be used as an adhesive. In some industrial fields, such as fan blades and sleepers, where it is necessary to apply a large amount of the adhesive, the suitable adhesive should not only meet the basic bonding properties, but also be characterized by a long effective processing time (i.e., a long pot life). However, during the preparation of an adhesive containing polyurethane resin, an isocyanate and a polyol generally undergo a rapid reaction after mixing, resulting in a fast gel solidification and a short pot life. This disadvantage restricts the application of the adhesive containing polyurethane resin, in particular the application of the adhesive containing polyurethane resin in the fields requiring a long pot life, such as in the field of fan blades or sleepers.

CN 103314027 B refers to a two-component polyurethane system with delayed crosslinking, comprising the following components: polyols, additives, 65-100 wt % of aromatic polyisocyanates, 0-35 wt % of aliphatic polyisocyanates and 0.1-3.0 wt % of a retarder, wherein the mixture has a viscosity (EN ISO 2555) of 100 mPas to 3000 mPas at 25° C., a glass transition temperature of higher than 50° C. and a pot life of longer than 60 minutes. However, the components of the polyurethane system readily react with water in the air to produce foam, which affects the bonding properties of the polyurethane.

CN 101525439 B refers to an adhesive containing a modified epoxy resin, comprising the following components: a bisphenol A type epoxy resin, a bisphenol F type epoxy resin, a difunctional polyurethane prepolymer having a molecular weight of 2000-3000 for modifying the epoxy resin, a silicone resin having a terminal amine group and a molecular weight of 500-1500, a hydroxyl-containing novolac resin having a molecular weight of 800-1400, a tetrafunctional epoxy resin and a polyether amine curing agent. The preparation method of the modified epoxy resin consists of the steps of: 1. preparing a polyurethane prepolymer; 2. preparing an epoxy resin; and 3. modifying the epoxy resin. The resulting modified epoxy resin can be applied to the mold-bonding of the female and male dies for a fan blade. However, the adhesive containing the modified epoxy resin generally requires a relatively long curing time and a curing temperature of more than 100° C., leading to low use efficiency in industry.

CN 101903433 B relates to two-component polyurethane adhesive based on an aromatic polyisocyanate and a polyester diol, a polycarbonate polyol, a polybutadiene polyol, castor oil or a dimer diol or a oleochemical polyol. It comprises a polyol component having an NCO/OH ratio of 0.9:1 to 1.5:1 and a crosslinking component prepared from the polyisocyanate, the polyol component containing: 2 to 30 wt. % of at least one polyester diol with a molecular weight of above 1000 g/mol, 5 to 35 wt. % of at least one 3- to 14-functional polyol, 5 to 35 wt. % of hydrophobic polyols, 2 to 65 wt. % of further additives or auxiliary substances, the total being intended to amount to 100%, wherein the crosslinked adhesive exhibits a glass transition temperature Tg of above 60° C. but below 130° C. The two-component polyurethane adhesive is used to bond glass fiber, carbon fiber or aramid fiber moldings based on polyester resin or polyepoxy resin. The polyurethane adhesive has a short pot life and readily reacts with water in the air.

WO 201696277 relates to a two-component polyurethane adhesive based on aromatic and aliphatic isocyanates having a high functionality. The two-component polyurethane adhesive has an NCO/OH ratio of 0.9:1 to 1.5:1, a glass transition temperature of higher than 60° C. after crosslinking, a modulus of elasticity of 4000 MPa, and a tensile strength of more than 40 MPa. The two-component polyurethane adhesive is suitable for bonding uneven surfaces and glass fiber, carbon fiber or aramid fiber molding based on polyester resin or polyepoxy resin. The two-component polyurethane adhesive has a short pot life and readily reacts with water in the air.

CN 102079810 A discloses a high-performance UV-curable polyurethane modified acrylic epoxy resin adhesive comprising a polyurethane-acrylic acid-epoxy resin photosensitive prepolymer. The method for preparing the photosensitive prepolymer comprises: a first step of synthesizing an epoxy acrylate prepolymer of a relatively low viscosity; a second step of preparing a polyurethane acrylate resin prepolymer; and a third step of mixing or reacting the above two prepolymers in a certain ratio to obtain the polyurethane-acrylic acid-epoxy resin photosensitive prepolymer. Furthermore, the polyurethane-acrylic acid-epoxy resin UV-curable adhesive is prepared by adding a photosensitive initiator, a photosensitive diluent, a photocuring crosslinking agent and other necessary auxiliary agents, etc. Since the adhesive requires UV-curing, it is suitable for bonding materials only requiring a relatively thin adhesive layer such as nylon film, but not suitable for bonding materials requiring a relatively thick adhesive layer such as fan blades.

CN 106634789 A relates to an UV-curable adhesive comprising the following components in parts by weight: 20-30 parts of polyurethane acrylic resin, 20-30 parts of epoxy acrylic resin, 30-40 parts of an active monomer, 5-10 parts of a filler, 4-7 parts of a photo-initiator and 0.5-1 part of a coupling agent. Since the adhesive requires UV-curing, it is suitable for bonding materials requiring a relatively thin adhesive layer, but not suitable for bonding materials requiring a relatively thick adhesive layer such as fan blades.

CN 103540288 A provides an UV-curable adhesive comprising a polyurethane (meth)acrylic resin obtained by reacting a polyol and a polyisocyanate as well as a (meth)acrylic compound having a hydroxyl group, a (meth)acrylic monomer, a photopolymerization initiator, as well as a light stabilizer and an antioxidant in a weight ratio of 95/5 to 5/95. Since the adhesive requires UV-curing, it is suitable for bonding materials requiring a relatively thin adhesive layer, but not suitable for bonding materials requiring a relatively thick adhesive layer such as fan blades.

Therefore, it is desired to develop an adhesive which has the advantages of being insensitive to moisture, good bonding properties and a long pot life, and which is suitable for the application requiring a relatively thick adhesive layer, such as the application for fan blades.

SUMMARY OF THE INVENTION

It is an object of the invention to provide an adhesive, a preparation method and application thereof, particularly the application for bonding glass fiber composites, and a bonded article obtained by using the adhesive.

The adhesive according to the present invention comprises the following components:
a. a polyisocyanate having an isocyanate functionality of not less than 2;
b. an epoxy-modified polyether polyol;
c. a hydroxyl-containing acrylate;
d. a redox catalyst;
e. a silane coupling agent;
f. optionally a polyol containing bisphenol A structure; and
g. optionally a polymer polyol different from the epoxy-modified polyether polyol;

wherein the hydroxyl-containing acrylate conforms to the following general formula:

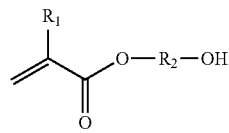

wherein $R_1$ is hydrogen or methyl or —$CH_2$—OH and $R_2$ is a saturated or unsaturated, linear or branched, aliphatic or cycloaliphatic divalent residue, having up to 18 carbon atoms, wherein said saturated or unsaturated, linear or branched, aliphatic or cycloaliphatic divalent residue, having up to 18 carbon atoms, can optionally comprise oxygen atoms and/or hydroxyl groups;
and wherein the redox catalyst is one or more of the following: a peroxide, a persulfide, a peroxycarbonate, a peroxyboric acid and an azide; the epoxy-modified polyether polyol has an amount of 50 wt % to 70 wt %, and the hydroxyl-containing acrylate has an amount of 25 wt % to 50 wt %, based on the sum of the weights of the components b, c, f and g as 100 wt %.

According to one aspect of the invention, there is provided a method for producing an adhesive provided by the present invention, comprising the step of mixing in any manner the polyisocyanate having an isocyanate functionality of not less than 2 (a), the epoxy-modified polyether polyol (b), the hydroxyl-containing acrylate (c), the redox catalyst (d), the silane coupling agent (e), the optional polyol containing bisphenol A structure (f) and the optional polymer polyol different from the epoxy-modified polyether polyol (g);
wherein the hydroxyl-containing acrylate conforms to the following general formula:

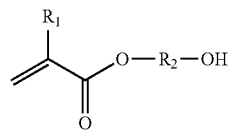

wherein $R_1$ is hydrogen or methyl or —$CH_2$—OH and $R_2$ is a saturated or unsaturated, linear or branched, aliphatic or cycloaliphatic divalent residue, having up to 18 carbon atoms, wherein said saturated or unsaturated, linear or branched, aliphatic or cycloaliphatic divalent residue, having up to 18 carbon atoms, can optionally comprise oxygen atoms and/or hydroxyl groups;
and wherein the redox catalyst is one or more of the following: a peroxide, a persulfide, a peroxycarbonate, a peroxyboric acid and an azide; the epoxy-modified polyether polyol has an amount of 50 wt % to 70 wt %, and the hydroxyl-containing acrylate has an amount of 25 wt % to 50 wt %, based on the sum of the weights of the components b, c, f and g as 100 wt %.

According to another aspect of the invention, there is provided the use of an adhesive provided by the present invention for bonding glass fiber composites.

According to yet another aspect of the invention, there is provided the use of an adhesive provided by the present invention for producing a bonded article.

According to still another aspect of the invention, there is provided a bonded article comprising an adhesive provided by the present invention.

According to still another aspect of the invention, there is provided a method for producing a bonded article, comprising the steps of:
i. injecting an adhesive provided by the present invention into a cavity of a part to be bonded or coating it onto a substrate to be bonded; and
ii. heating and curing the adhesive to obtain the bonded article.

The adhesive according to the present invention is insensitive to moisture, and has a long pot life and also good bonding properties. Therefore, it is particularly suitable for bonding glass fiber composites requiring a relatively thick adhesive layer.

DETAILED DESCRIPTION

The present invention provides an adhesive comprising the following components:
a. a polyisocyanate having an isocyanate functionality of not less than 2;
b. an epoxy-modified polyether polyol;
c. a hydroxyl-containing acrylate;
d. a redox catalyst;
e. a silane coupling agent;
f. optionally a polyol containing bisphenol A structure; and
g. optionally a polymer polyol different from the epoxy-modified polyether polyol;
wherein the hydroxyl-containing acrylate conforms to the following general formula:

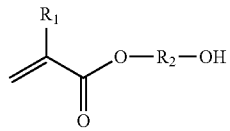

wherein $R_1$ is hydrogen or methyl or —$CH_2$—OH and $R_2$ is a saturated or unsaturated, linear or branched, aliphatic or cycloaliphatic divalent residue, having up to 18 carbon atoms, wherein said saturated or unsaturated, linear or branched, aliphatic or cycloaliphatic divalent residue, having up to 18 carbon atoms, can optionally comprise oxygen atoms and/or hydroxyl groups;
and wherein the redox catalyst is one or more of the following: a peroxide, a persulfide, a peroxycarbonate, a peroxyboric acid and an azide; the epoxy-modified polyether polyol has an amount of 50 wt % to 70 wt %, and the hydroxyl-containing acrylate has an amount of 25 wt % to 50 wt %, based on the sum of the weights of the components b, c, f and g as 100 wt %. The present invention also provides a preparation method and application of the adhesive, particularly the application for bonding glass fiber composites, and a bonded article obtained by using the adhesive.

The term "curing" as used herein refers to the process of an adhesive from a liquid state to a solidified state.

The term "adhesive" as used herein refers to a mixture comprising a curable and viscous chemical component, and is also used as a synonym for a tackiness agent and/or a sealant and/or a binder.

The term "polyurethane" as used herein refers to polyurethaneurea and/or polyurethane polyurea and/or polyurea and/or polythiourethane.

The term "each independently" as used herein refers to that they may be the same or different.

Polyisocyanate Having an Isocyanate Functionality of Not Less Than 2

The polyisocyanate having an isocyanate functionality of not less than 2 preferably conforms to the general formula $R(NCO)_n$, wherein R is one or more of the following: an aliphatic hydrocarbon group having 2 to 18 carbon atoms, an aromatic hydrocarbon group having 6 to 15 carbon atoms and an araliphatic hydrocarbon group having 8 to 15 carbon atoms, and n is 2-4.

The polyisocyanate preferably has a isocyanate functionality of 2-3.

The polyisocyanate preferably has a viscosity of less than 50-1000 mPa·s, and most preferably 50-700 mPa·s, determined according to DIN EN ISO 3219:1994-10 at 23° C. with a shear rate of 10 $s^{-1}$.

The polyisocyanate preferably has an isocyanate group content of 20 wt % to 35 wt %, based on the weight of the polyisocyanate as 100 wt %.

The polyisocyanate is preferably one or more of the following: diphenylmethane-4,4'-diisocyanate (MDI), diphenylmethane-2,4'-diisocyanate (MDI), diphenylmethane-2,2'-diisocyanate (MDI), vinyl diisocyanate, tetramethylene 1,4-diisocyanate, hexane diisocyanate (HDI), dodecyl 1,2-diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethylcyclohexane, hexahydrotoluene-2,4-diisocyanate, hexahydrophenyl-1,3-diisocyanate, hexahydrophenyl-1,4-diisocyanate, perhydro-diphenylmethane 2,4-diisocyanate, perhydro-diphenylmethane 4,4-diisocyanate, phenylene 1,3-diisocyanate, phenylene 1,4-diisocyanate, durene 1,4-diisocyanate, stilbene stilbene 1,4-diisocyanate, 3,3-dimethyl 4,4-diphenyl diisocyanate, toluene-2,4-diisocyanate (TDI), toluene-2,6-diisocyanate (TDI), polydiphenylmethane diisocyanate (PMDI) and carbodiimide-modified isocyanate, allophanate-modified isocyanate and isomers of the above isocyanates.

The polyisocyanate is further preferably one or more of the following: polydiphenylmethane diisocyanate, toluene diisocyanate and carbodiimide-modified diphenylmethane diisocyanate, and most preferably polydiphenylmethane diisocyanate.

The polyisocyanate preferably has an amount of 38 wt % to 60 wt %, and most preferably 45 wt % to 53 wt %, based on the amount of the adhesive as 100 wt %.

Epoxy-Modified Polyether Polyol

The epoxy-modified polyether polyol preferably has a hydroxyl functionality of 2 to 8, further preferably 2 to 6, and most preferably 2 to 3.

The epoxy-modified polyether polyol preferably has a hydroxyl value of 18 mg KOH/g to 1200 mg KOH/g, further preferably 150 mg KOH/g to 800 mg KOH/g, and most preferably 200 mg KOH/g to 500 mg KOH/g.

In one embodiment of the invention, the polyether polyol preferably has a functionality of 2 to 8 and a hydroxyl value of 18 mg KOH/g to 1200 mg KOH/g; the polyether polyol further preferably has a functionality of 2 to 6 and a hydroxyl value of 150 mg KOH/g to 800 mg KOH/g; and the polyether polyol most preferably has a functionality of 2 to 3 and a hydroxyl value of 200 mg KOH/g to 500 mg KOH/g.

The epoxy-modified polyether polyol has a viscosity of preferably 20 mPa·s to 500 mPa·s and a number average molecular weight of preferably 300 to 500.

The epoxy-modified polyether polyol is preferably obtained by reacting a system comprising a polyol and an alkylene oxide compound, wherein an epoxide ring-opening reaction takes place.

The polyol preferably contains at least two hydroxyl groups.

The polyol has a hydroxyl functionality of preferably 3 to 8, and a hydroxyl value of preferably 18 to 1200 mg KOH/g.

The hydroxyl group includes a primary hydroxyl group, a secondary hydroxyl group, a tertiary hydroxyl group, or a combination thereof.

The polyol is preferably one or more of the following: ethylene glycol, diethylene glycol, triethylene glycol, tetraethylene glycol, 1,2-propanediol, 1,3-propanediol, 1,4-butanediol, 3-methyl-1,5-pentanediol, 1,5-pentanediol, 1,6-hexanediol, 1,10-nonanediol, glycerol, 1,2,4-butanetriol, 1,2,5-n-pentanetriol, 1,3,5-n-pentanetriol, 1,2,6-n-hexanetriol, 1,2,5-n-hexanetriol, 1,3,6-n-hexanetriol, trimethylolbutane, trimethylolpropane, di(trimethylolpropane), trimethylolethane, pentaerythritol and dipentaerythritol, and most preferably one or more of the following: propanediol and glycerol.

The alkylene oxide compound preferably conforms to the following general formula:

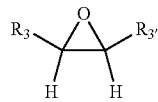

wherein $R_3$ and $R_{3'}$ are each independently hydrogen, a linear C1-C6 alkyl, a branched C1-C6 alkyl, phenyl or substituted phenyl.

$R_3$ and $R_{3'}$ are each independently preferably hydrogen, methyl, ethyl, propyl or phenyl.

The alkylene oxide compound is preferably one or more of the following: 1,2-propylene oxide, 1,2-butylene oxide, 2,3-butylene oxide, styrene oxide, and a heteroalkylene oxide.

The heteroalkylene oxide is preferably one or more of the following: tetrahydrofuran and oxetane.

The preparation method of the alkylene oxide compound can be well-known to those skilled in the art, and it can be obtained, for example, by an oxidation reaction of an olefin compound.

The epoxy-modified polyether polyol which can be used in the present invention is preferably one or more of the following: GE 303 (with glycerol as a starting agent and a hydroxyl value of 480 mg KOH/g), GR 635s (with sorbitol and glycerol as starting agents and a hydroxyl value of 500 mg KOH/g), GSU-450L (with sucrose and glycerol as starting agents and a hydroxyl value of 435 mg KOH/g), GMN-450 (with glycerol as a starting agent and a hydroxyl value of 450 mg KOH/g) available from Sinopec Shanghai Gaoqiao Branch, Desmophen 3601 (with sucrose and glycerol as starting agents and a hydroxyl value of 260 mg KOH/g) and Desmophen 21AP27 (with sucrose and ethylene glycol as starting agents and a hydroxyl value of 440 mg KOH/g) available from Bayer Material Science.

The method for measuring the hydroxyl value herein employs that disclosed in Houben Weyl, Methoden der Organischen Chemie, vol. XIV/2 Makromolekulare Stoffe, p.17, Georg Thieme Verlag; Stuttgart 1963. The entire contents of this document are incorporated herein by reference.

The epoxy-modified polyether polyol has an amount of 50 wt % to 70 wt %, based on the sum of the weights of the components b, c, f and g as 100 wt %.

Polymer Polyol Different from the Epoxy-Modified Polyether Polyol

The polymer polyol different from the epoxy-modified polyether polyol is preferably one or more of the following: a polyester polyol, a polyether polyol, a polycarbonate polyol, a polytetrahydrofuran polyol, a polycaprolactone polyol, a SAN polymer polyol, a PHD polymer polyol, a PIPA polymer polyol, a vegetable oil, and a vegetable oil polyol.

The polyester polyol can be prepared by reacting a system comprising a dicarboxylic acid or a dicarboxylic anhydride and a polyol. The dicarboxylic acid is preferably an aliphatic carboxylic acid having 2 to 12 carbon atoms, such as succinic acid, malonic acid, glutaric acid, adipic acid, suberic acid, azelaic acid, sebacic acid, dodecyl carboxylic acid, maleic acid, fumaric acid, phthalic acid, isophthalic acid, terephthalic acid or a mixture thereof. The dicarboxylic anhydride is preferably one or more of the following: phthalic anhydride, tetrachlorophthalic anhydride, and maleic anhydride. The polyol is preferably one or more of the following: ethylene glycol, diethylene glycol, 1,2-propanediol, 1,3-propanediol, dipropylene glycol, 1,3-methylpropanediol, 1,4-butanediol, 1,5-pentanediol, 1,6-hexanediol, neopentyl glycol, 1,10-nonanediol, glycerol and trimethylolpropane.

The polyester polyol can also be prepared by reacting a system comprising a lactone, preferably ε-caprolactone.

The polyether polyol can be prepared by well-known processes, for example, by reacting an olefin oxide with a starting agent in the presence of a catalyst. The catalyst is preferably one or more of the following: an alkali hydroxide, an alkali alcoholate, antimony pentachloride, and boron fluoride ethyl ether. The olefin oxide is preferably one or more of the following: tetrahydrofuran, ethylene oxide, 1,2-propylene oxide, 1,2-butylene oxide, 2,3-butylene oxide, and styrene oxide. The starting agent is preferably a polyhydroxy compound such as water, ethylene glycol, 1,2-propanediol, 1,3-propanediol, diethylene glycol, glycerol, trimethylolpropane, pentaerythritol, sorbitol, sucrose or a mixture thereof.

The polyether polyol is preferably one or more of the following: a polypropylene oxide polyol, a polyethylene oxide polyol, and a polytetrahydrofuran polyol.

The polycarbonate polyol is preferably a polycarbonate diol. The polycarbonate diol can be prepared by reacting a diol with a dialkyl or diaryl carbonate or phosgene. The dialkyl or diaryl carbonate is preferably diphenyl carbonate. The polycarbonate diol is preferably one or more of the following: 1,2-propanediol, 1,3-propanediol, 1,4-butanediol, 1,5-pentanediol, 1,6-hexanediol, diethylene glycol and trioxane diol.

The SAN polymer polyol, the PHD polymer polyol, and the PIPA polymer polyol are a stable dispersion of solid reinforcing particles in a polyol liquid.

The SAN polymer polyol is preferably obtained by in-situ polymerization of a mixture comprising acrylonitrile and styrene in a basic polyol.

The PHD polymer polyol is preferably obtained by in-situ polymerization of a mixture comprising an isocyanate and a diamine in a basic polyol.

The PIPA polymer polyol is preferably obtained by in-situ polymerization of a mixture comprising an isocyanate and a diol and/or a diol-amine in a basic polyol.

The vegetable oil is preferably synthesized from an unsaturated fatty acid and glycerol or obtained from fruits, seeds and germs of plants. The vegetable oil is preferably one or more of the following: peanut oil, soybean oil, linseed oil, castor oil, rapeseed oil and palm oil, and most preferably castor oil.

The vegetable oil polyol is preferably prepared by a process such as cracking, oxidation or transesterification using one or more vegetable oils as starting agents. The vegetable oil is preferably one or more of the following: soybean oil, palm oil, peanut oil, low erucic acid rapeseed oil, and ricinoleic acid containing a hydroxyl group and an unsaturated double bond.

The polymer polyol different from the epoxy-modified polyether polyol preferably has an amount of 10 wt % to 20 wt %, based on the amount of the adhesive as 100 wt %.

The weight ratio of the sum of the weights of the epoxy-modified polyether polyol and the optional polyether polyol different from the epoxy-modified polyether polyol to that of the polyisocyanate is from 0.4 to 1.2, and most preferably from 0.45 to 1.15.

Hydroxy-Containing Acrylate

The hydroxyl-containing acrylate has an amount of 25 wt % to 50 wt %, and preferably 30 wt % to 50 wt %, based on the sum of the weights of the components b, c, f and g as 100 wt %.

The hydroxyl-containing acrylate preferably conforms to the following general formula:

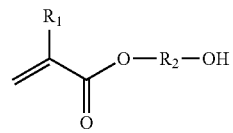

wherein $R_1$ is hydrogen or methyl or —$CH_2$—OH and $R_2$ is a saturated or unsaturated, linear or branched, aliphatic or cycloaliphatic divalent residue, having up to 18 carbon atoms, wherein said saturated or unsaturated, linear or branched, aliphatic or cycloaliphatic divalent residue, having up to 18 carbon atoms, can optionally comprise oxygen atoms and/or hydroxyl groups; .

The hydroxyl-containing acrylate is further preferably one or more of the following: a hydroxyl-containing acrylic acid or methacrylic acid derivative, 3-hydroxypropyl ester, 2-hydroxypropyl ester, hydroxybutyl ester, polyvinyl alcohol monohydroxy ester, methyl hydroxy acrylate hydroxyalkyl ester and polypropylene glycol monohydroxy ester; more preferably one or more of the following: a hydroxyl-containing acrylic acid or methacrylic acid derivative, 3-hydroxypropyl ester, 2-hydroxypropyl ester, hydroxybutyl ester and polyvinyl alcohol monohydroxy ester; further preferably a hydroxyl-containing acrylic acid or methacrylic acid derivative; and most preferably hydroxypropyl methacrylate.

The sum of the weights of the component b, the component c, the component f and the component g is preferably 30 wt % to 60 wt %, and most preferably 40 wt % to 55 wt %, based on the amount of the adhesive as 100 wt %.

Redox Catalyst

The redox catalyst is a radical initiator which can initiate the curing of a double bond-containing compound.

The redox catalyst is preferably one or more of the following: benzoyl peroxide (BPO), tert-butyl peroxybenzoate (TBPB), methyl ethyl ketone peroxide and dicumyl peroxide (DCP), and most preferably one or more of the following: benzoyl peroxide and methyl ethyl ketone peroxide.

The redox catalyst can be directly mixed with the epoxy-modified polyether polyol, or can be directly mixed with the polyisocyanate having an isocyanate functionality of not less than 2, or can be directly mixed with the epoxy-modified polyether polyol and the polyisocyanate having an isocyanate functionality of not less than 2.

The redox catalyst preferably has an amount of 0.5 wt % to 1.5 wt %, and most preferably 0.9 wt % to 1.1 wt %, based on the amount of the adhesive as 100 wt %.

Silane Coupling Agent

The silane coupling agent preferably conforms to the general formula $XSi(OR_4)_3$, wherein X is one or more of the following: vinyl, γ-methacryloxypropyl and γ-isocyanatopropyl; and $R_4$ is one or more of the following: methyl and ethyl.

The silane coupling agent is further preferably one or more of the following: vinyltrimethoxysilane, vinyltriethoxysilane, vinyl-tris-(2-methoxyethoxy)silane, vinylmethyldimethoxysilane, vinyltriisopropoxysilane, γ-isocyanatopropyltrimethoxysilane, γ-isocyanatopropyltriethoxysilane, γ-methacryloxypropyltriisopropoxysilane, γ-methacryloxypropyltrimethoxysilane, γ-methacryloxypropyltriethoxysilane, tosyl isocyanate, and tri-(3-trimethoxysilylpropyl)isocyanurate, and most preferably vinyltriethoxysilane.

The silane coupling agent preferably has an amount of 0.5 wt % to 1.5 wt %, and most preferably 0.9 wt % to 1.1 wt %, based on the amount of the adhesive as 100 wt %.

Polyol Containing Bisphenol A Structure

The polyol containing bisphenol A structure preferably has an amount of 0 to 30 wt %, further preferably 5 to 25 wt %, and most preferably 5 to 8 wt %, based on the amount of the adhesive as 100 wt %.

The polyol containing bisphenol A structure preferably conforms to the following general formula:

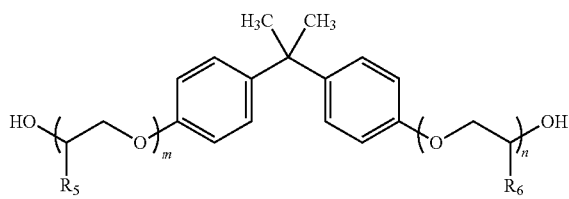

wherein m and n are each independently an integer from 1 to 200, and $R_5$ and $R_6$ are each independently an alkyl group.

m and n are each independently preferably an integer from 1 to 10, and each independently most preferably an integer from 1 to 5.

$R_5$ and $R_6$ are each independently preferably one or more of the following: methyl and ethyl, and each independently most preferably methyl.

The polyol containing bisphenol A structure is most preferably Innonyx P263.

Other Components

The adhesive may further comprise one or more of the following: a dehydrating agent, a defoamer, an inhibitor, a surfactant, a pigment paste, and a filler.

The dehydrating agent is preferably one or more of the following: (tri)ethyl orthoformate, oxazolidine and molecular sieves, and most preferably an aluminosilicate-type inorganic dehydrating agent.

The inhibitor is preferably one or more of the following: benzoyl quinone, p-benzoquinone, tert-butyl catechol, hydroquinone such as methylhydroquinone and methyl ethyl-hydroquinone (MEHQ), butylated hydroxytoluene (BHT), butylated hydroxyaniline (BHA) and 2-hydroxy-4 methoxy-benzophenone.

The filler is preferably one or more of the following: bentonite, fly ash, wollastonite, perlite powder, floating beads, calcium carbonate, talc powder, mica powder, china clay, fumed silica, expandable microspheres, diatomite, volcanic ash, barium sulfate, calcium sulfate, glass microspheres, stone powder, wood powder, wood chips, bamboo powder, bamboo chips, rice grains, straw chips, sorghum stalk chips, graphite powder, metal powder, thermosetting composite recyclate powder, plastic particles and plastic powder.

The selection and metering of the above other components are in principle known to those skilled in the art and are readily measurable.

Application

The glass fiber composite is preferably one or more of the following: glass fiber reinforced epoxy resin, glass fiber reinforced polyurethane resin, and glass fiber reinforced foamed polyurethane.

Method for Producing a Bonded Product

The cavity of a part to be bonded is preferably made of a glass fiber composite.

The substrate to be bonded is preferably made of a glass fiber composite.

The glass fiber composite is preferably one or more of the following: glass fiber reinforced epoxy resin, glass fiber reinforced polyurethane resin, and glass fiber reinforced foamed polyurethane.

The bonded article is preferably a fan blade or a sleeper.

The adhesive preferably has a thickness of 5 mm to 20 mm after heating and curing.

The heating and drying can remove a volatile component. The volatile component may be water.

The heating temperature can be as high as possible, but should not be above the temperature limit at which the material begins to deform in an uncontrollable manner or encounter any other damage.

The heating is preferably from 120° C. to 210° C., further preferably from 150° C. to 200° C., and most preferably from 160° C. to 180° C.

EXAMPLES

All technical and scientific terms used herein have the same meaning as commonly understood by those skilled in the art to which the present invention belongs, unless otherwise defined. When the definition of a term in the present description conflicts with the meaning as commonly understood by those skilled in the art to which the present invention belongs, the definition described herein shall apply.

All numerical values expressing amount of ingredients, reaction conditions and the like which are used in the description and claims are to be understood as being modified by the term "about", unless otherwise specified. Accordingly, unless indicated to the contrary, the numerical values and parameters described herein are approximate values which can be varied according to the desired performance obtained as required.

The term "and/or" used herein refers to one or all of the elements mentioned.

The terms "containing", "including" and "comprising" used herein cover both the case that there are only the elements mentioned and the case that there are also other elements unmentioned in addition to the elements mentioned.

All percentages in the present invention refer to weight percentage, unless otherwise specified.

The analysis and measurement in the present invention were carried out at 23° C., unless otherwise specified.

The grammatical articles "one", "a", "an", and "the", as used in this specification, are intended to include "at least one" or "one or more", unless otherwise specified. By way of example, "a component" means one or more components, and thus, possibly, more than one component is contemplated and may be employed or used in an implementation of the described embodiments.

The isocyanate group (NCO) content was determined by volume according to DIN-EN ISO 11909 and the measured data includes both free and potentially free NCO contents.

The isocyanate functionality was determined according to GPC.

The number average molecular weight was determined by gel permeation chromatography using tetrahydrofuran as the mobile phase and control polystyrene standards at 23° C.

The isocyanate index of the polyisocyanate=moles of isocyanate groups of the polyisocyanate having an isocyanate functionality of not less than 2)/moles of isocyanate-reactive groups in the adhesive.

The viscosity was determined according to DIN EN ISO 3219:1994-10 at 23° C. and a shear rate of 10 s$^{-1}$ by selecting the MV-DIN rotor.

Test for moisture sensitivity: a cured concrete slab was immersed in water for 4 hours and then dried with paper; a mixed adhesive was coated onto the surface of the concrete slab with a coating thickness of about 1 mm; after curing at room temperature for 24 hours, it was observed whether or not the surface of the cured adhesive foamed. The moisture sensitivity was classified into foaming, slight foaming, and no foaming. No foaming was regarded as qualified, that is, insensitive to moisture.

Test for pot life: the polyisocyanate and the epoxy-modified polyether polyol were separately vacuum-degassed at 25° C. for 1-2 hours for use, and then the components of the adhesive were mixed and stirred uniformly. The viscosity value of the adhesive was tested according to Standard DIN EN ISO 3219. The pot life of the adhesive is the time from the adhesive being uniformly mixed to the adhesive having a viscosity value of more than 600 mPa·s. A longer pot life is always desired.

Test for maximum exothermic peak: a thermocouple for measuring temperature was placed in the middle of a 500 ml paper reaction cup and connected to a computer. 300 g of the polyisocyanate and 300 g of the epoxy-modified polyether polyol were separately vacuum-degassed at 25° C. for 1-2 hours for use, and then the components of the adhesive were mixed and stirred uniformly, and poured into the reaction cup. It began to test and record the temperature-time curve, wherein the highest temperature corresponded to the maximum exothermic peak. A lower maximum exothermic peak indicates a shorter post-curing time of the adhesive and a higher production efficiency.

Determination of impact resistance: a mold was placed in an oven at 160° C. for temperature control for 10 minutes. According to the required chemical composition of the adhesive, the components were mixed and stirred uniformly, and then mixed in a centrifugal stirrer at a rotation rate of 1500 rpm for 10 minutes to obtain a mixture, which was poured into the mold having a diameter*thickness of 5 cm*0.5 cm and cured at 160° C. for 10 minutes and then at room temperature for 24 hours to obtain a sample. The sample was impacted by free fall of an impact head having a weight of 2 kg and a diameter of 0.5 cm from a height of 50 cm. The test results can be expressed in terms of being punctured, cracked and not punctured, the sequence of which indicates that the bonding performance is from poor to good.

Test for Barcol hardness: performed according to American Standard ASTM B648.

Test for tensile modulus: DIN EN ISO 14125.
Test for tensile strength: DIN EN ISO 14125.
Test for tensile elongation at break: DIN EN ISO 14125.
Test for volume shrinkage: ASTM D696.
Test for bending strength: GB/T 9341-2000.
Heat distortion temperature: ASTM D648, ISO 75-2, GB/T 1634.2.
Tensile shear strength: rigid material vs. rigid material, GB 7124-2008 T.

The higher the following performance indexes are, the better bonding properties an adhesive has: Barcol hardness, tensile modulus, tensile strength, bending strength, tensile elongation at break, heat distortion temperature, volume shrinkage and tensile shear strength.

Raw Materials and Reagents

Desmodur 1511L: a polydiphenylmethane diisocyanate (PMDI) having an isocyanate functionality of 2.7, an NCO group content of 30.5-32.5 wt %, and a viscosity of 160-240 mPa·s, available from Covestro Polymers Co., Ltd.

Desmodur 88TM12: a polyisocyanate having an isocyanate functionality of 2.0, an NCO group content of 23.5 wt %, and a viscosity of 350-550 mPa·s, available from Covestro Polymers Co., Ltd.

Epoxy-modified polyether polyol 1: epoxy-modified polyether polyol NJ-303E, available from Ningwu New Materials Co., Ltd., obtained by using glycerol as the starting agent and propylene oxide as the main reactant of polymerization, having a hydroxyl value of 470 mg KOH/g, a hydroxyl functionality of 3, a viscosity of 450 mPa·s, and a number average molecular weight of 350.

Epoxy-modified polyether polyol 2: epoxy-modified polyether polyol GY-420, available from Guodu Chemical (Kunshan) Co., Ltd., obtained by using glycerol as the starting agent and propylene oxide as the main reactant of polymerization, having a hydroxyl value of 350 mg KOH/g, a hydroxyl functionality of 3, a viscosity of 450 mPa·s, and a number average molecular weight of 480.

Epoxy-modified polyether polyol 3: epoxy-modified polyether polyol NJ-204, available from Ningwu New Materials Co., Ltd., obtained by using propylene glycol as the starting agent and propylene oxide as the main reactant of polymerization, having a hydroxyl value of 280 mg KOH/g, a hydroxyl functionality of 2, a viscosity of 70 mPa·s, and a number average molecular weight of 400.

adhesives shown in Table 1, the components were mixed and stirred uniformly, and then mixed in a centrifugal stirrer having a rotation rate of 1500 rpm for 10 minutes to obtain a mixture, which was poured into the mold and cured at 160° C. for 120 minutes to obtain the cured adhesives of Comparative Examples 1-3 and Examples 1-3, respectively. These adhesives were tested in terms of moisture sensitivity, pot life, Barcol hardness, tensile modulus, tensile strength, tensile elongation at break, volume shrinkage, heat distortion temperature, and impact resistance.

Table 1 lists the composition of the adhesives of Examples 1-3 and Comparative Examples 1-3 and the performance indexes of these adhesives.

TABLE 1

Composition and performance indexes of the adhesives

| Adhesive composition | Comparative Example 1 | Comparative Example 2 | Comparative Example 3 | Example 1 | Example 2 | Example 3 |
|---|---|---|---|---|---|---|
| Epoxy-modified polyether polyol 1 | 100 | 90 | 80 | 70 | 60 | 50 |
| Hydroxypropyl methacrylate | / | 10 | 20 | 30 | 40 | 50 |
| A151 | 2 | 2 | 2 | 2 | 2 | 2 |
| Benzoyl peroxide | / | 2 | 2 | 2 | 2 | 2 |
| Desmodur 1511L | 117 | 115 | 112 | 110 | 108 | 106 |
| Isocyanate index | 1.05 | 1.05 | 1.05 | 1.05 | 1.05 | 1.05 |
| Moisture sensitivity | Foaming | Foaming | Slight foaming | No foaming | No foaming | No foaming |
| Pot life (min) | 82 | 125 | 140 | 172 | 214 | 275 |
| Barcol hardness (Hba) | 36 | 37 | 40 | 43 | 48 | 52 |
| Tensile modulus (MPa) | 3100 | 3300 | 3500 | 3700 | 3900 | 3900 |
| Tensile strength (MPa) | 80 | 85 | 87 | 90 | 93 | 95 |
| Tensile elongation at break (%) | 5.6 | 4.6 | 3.8 | 3.6 | 3.4 | 3.1 |
| Volume shrinkage (%) | 8.4 | 9.1 | 9.2 | 9.3 | 9.5 | 9.8 |
| Heat distortion temperature (° C.) | 62 | 73 | 82 | 91 | 98 | 105 |
| Impact resistance | Punctured | Punctured | Cracked | Not punctured | Not punctured | Not punctured |

Hydroxypropyl methacrylate (HPMA): available from Shanghai Pharmaceutical Group.

Trigonox 400: methyl ethyl ketone peroxide, available from Akzo Corporation.

Benzoyl peroxide: a commercially available chemically pure product.

NOROX KP-925H: a butanone oxide composition, available from SYRGIS Corporation.

Innonyx P263: a polyol containing bisphenol A structure, OHNO=326, having a hydroxyl functionality of 2, available from Taiwan's Innonyx International Co., Ltd.

EPIKOTE™ Resin RIM 135: an epoxy resin, commonly used in standard fan blade production, available from Hexion Corporation.

EPIKURE™ RIM 135H: an epoxy resin, commonly used in standard fan blade production, available from Hexion Corporation.

A 151: vinyltriethoxysilane.

Examples 1-3 and Comparative Examples 1-3

A mold was placed in an oven at 160° C. for temperature control for 10 minutes. According to the composition of the adhesives shown in Table 1, the components were mixed and When comparing Comparative Examples 1-3 with Examples 1-3, it can be seen that the adhesives according to the present invention are insensitive to moisture in view of the result of no foaming, and have a greatly prolonged pot life and good bonding properties. When the hydroxyl-containing acrylate has a content of 30 wt % to 50 wt %, and the epoxy-modified polyether polyol has a content of 50 wt % to 70 wt %, the overall performance, including moisture insensitivity, pot life and bonding properties, of the corresponding adhesives is optimal.

Examples 5-7 and Comparative Example 4

The polyisocyanate and the epoxy-modified polyether polyol 2 were separately evacuated at 25° C. for 0.1 to 2 hours to remove bubbles in their raw materials. A mold was placed in an oven at 160° C. for temperature control for 10 minutes. According to the composition of the adhesives shown in Table 2, the components were mixed and stirred uniformly, and then mixed in a centrifugal stirrer having a rotation rate of 1500 rpm for 10 minutes to obtain a mixture, which was poured into the mold and cured at 160° C. for 120 minutes to obtain the cured adhesives of Comparative Example 4 and Examples 5-7, respectively. These adhesives were tested in terms of moisture sensitivity, pot life, Barcol hardness, tensile modulus, tensile strength, bending strength, tensile elongation at break, heat distortion temperature, and impact resistance.

Table 2 lists the composition of the adhesives of Examples 5-7 and Comparative Example 4 and the performance indexes of these adhesives.

TABLE 2

Composition and performance indexes of the adhesives

| Adhesive composition | Comparative Example 4 | Example 5 | Example 6 | Example 7 |
|---|---|---|---|---|
| Epoxy-modified polyether polyol 2 | 100 | 70 | 60 | 55 |
| Hydroxypropyl methacrylate | / | 30 | 30 | 30 |
| A151 | 2 | 2 | 2 | 2 |
| Innonyx P263 | / | / | 10 | 15 |
| NOROX KP-925H | / | 2 | 2 | 2 |
| Desmodur 1511L | 87 | 91 | 93 | 94 |
| Isocyanate index | 1.05 | 1.05 | 1.05 | 1.05 |
| Performance indexes | | | | |
| Moisture sensitivity | Foaming | No foaming | No foaming | No foaming |
| Pot life (min) | 39 | 90 | 88 | 86 |
| Barcol hardness (Hba) | 85 | 86 | 86 | 88 |
| Tensile modulus (MPa) | 3100 | 3300 | 3700 | 3900 |
| Tensile strength (MPa) | 61 | 74 | 80 | 82 |
| Bending strength (MPa) | 103 | 118 | 125 | 134 |
| Tensile elongation at break (%) | 3.4 | 4.5 | 4.7 | 4.8 |
| Heat distortion temperature (° C.) | 61 | 93 | 94 | 95 |
| Impact resistance | punctured | Not punctured | Not punctured | Not punctured |

When comparing Comparative Example 4 with Examples 5-7, it can be seen that the adhesives according to the present invention are insensitive to moisture in view of the result of no foaming, and have a greatly prolonged pot life and good bonding properties.

When comparing Examples 5-7, it can be seen that the adhesives have further improved bonding properties while maintaining moisture insensitivity and a long pot life, provided that they further comprises a polyol containing bisphenol A structure.

Examples 8-9 and Comparative Example 5

The surfaces of the samples to be bonded (having a sample size of (100±0.25 mm)*(25±0.25 mm)*(1.5±0.1 mm), a length of the bonded surface of (12.5±0.25 mm), and made of glass fiber reinforced plastics) were respectively washed with a cleaning solution (95 parts by weight of methyl ethyl ketone, 2 parts by weight of vinyltrimethoxysilane, and 3 parts by weight of γ-aminopropyltrimethoxysilane A-1100) at 25° C., and naturally dried at 25° C. for 20 minutes. The polyisocyanate and the epoxy-modified polyether polyol were separately evacuated at 25° C. for 0.1 to 2 hours to remove bubbles in their raw materials. A mold was placed in an oven at 160° C. for temperature control for 10 minutes. According to the composition of the adhesives shown in Table 3, the components were mixed and stirred uniformly, and then mixed in a centrifugal stirrer having a rotation rate of 1500 rpm for 10 minutes to obtain a mixture, which was uniformly coated on one surface of each sample with a brush. Two samples were bonded together by bringing their surfaces coated with the mixture into contact and clamped with a clip. After curing at 80° C. for 180 minutes and cooling at room temperature for 30 minutes, the bonded samples were tested in terms of moisture sensitivity, pot life, Barcol hardness and tensile shear strength.

Table 3 lists the composition and performance indexes of the adhesives of Examples 8-9 and Comparative Example 5.

TABLE 3

Composition and performance indexes of the adhesives

| Adhesive composition | Comparative Example 5 | Example 8 | Example 9 |
|---|---|---|---|
| Epoxy-modified polyether polyol 3 | 100 | 55 | 55 |
| Hydroxypropyl methacrylate | / | 45 | 45 |
| A-151 | 2 | 2 | 2 |
| NOROX KP-925H | / | 2 | 2 |
| Desmodur 1511L | 69 | 86 | |
| Desmodur 88TM12 | | | 114 |
| Isocyanate index | 1.05 | 1.05 | 1.05 |
| Performance indexes | | | |
| Moisture sensitivity | Foaming | No foaming | No foaming |
| Pot life (min) | 80 | 90 | 98 |
| Barcol hardness (Hba) | 28 | 32 | 30 |
| Tensile shear strength (N/mm$^2$) (made of glass fiber reinforced plastics) | 10.5 | 17.5 | 15.4 |
| Tensile shear strength (N/mm$^2$) (made of steel) | 12.3 | 21.2 | 18.6 |
| Tensile shear strength (N/mm$^2$) (made of aluminum) | 12.0 | 20.6 | 17.0 |

When comparing Comparative Example 5 with Examples 8-9, it can be seen that the adhesives according to the present invention are insensitive to moisture in view of the result of no foaming, and have a greatly prolonged pot life and good bonding properties.

It can be seen from Examples 8 and 9 that both of the adhesives comprising different polyisocyanates are insensitive to moisture, and have a long pot life and good bonding properties, wherein the overall performance of the adhesive comprising PMDI is better than that of the adhesive comprising an isocyanate prepolymer.

Example 10 and Comparative Example 6

The polyisocyanate and the epoxy-modified polyether polyol were separately evacuated at 25° C. for 0.1 to 2 hours to remove bubbles in their raw materials. A mold was placed in an oven at 160° C. for temperature control for 10 minutes. According to the composition of the adhesives shown in Table 4, the components were mixed and stirred uniformly, and then mixed in a centrifugal stirrer having a rotation rate of 1500 rpm for 5 minutes to obtain a mixture, part of which was poured into a viscosity test cup to measure its viscosity and the remaining into the mold and cured at 160° C. for 120 minutes and at room temperature for 3 days to obtain the cured adhesives of Comparative Example 6 and Example 10, respectively. The adhesives were tested in terms of viscosity, moisture sensitivity, pot life, tensile modulus, tensile strength, tensile elongation at break, heat distortion temperature, impact resistance, and maximum exothermic peak.

Table 4 lists the composition and performance indexes of the adhesives of Example 10 and Comparative Example 6.

TABLE 4

Composition and performance indexes of the adhesives

| Adhesive composition | Comparative Example 6 | Example 10 |
|---|---|---|
| EPIKOTE ™ Resin RIM 135 | 100 | |
| EPIKURE ™ RIM 135H | 45 | |
| Epoxy-modified polyether polyol 1 | | 15 |
| Epoxy-modified polyether polyol 3 | | 40 |
| Hydroxypropyl methacrylate | | 45 |
| A151 | | 2 |
| Trigonox 400 | | 2 |
| Desmodur 1511L | | 88 |
| Isocyanate index | 1.05 | 1.05 |
| Performance indexes | | |
| Adhesive viscosity −30 min (mPa · s) | 290 | 80 |
| Adhesive viscosity −60 min (mPa · s) | 310 | 100 |
| Adhesive viscosity −90 min (mPa · s) | 350 | 220 |
| Adhesive viscosity −120 min (mPa · s) | 420 | 280 |
| Adhesive viscosity −150 min (mPa · s) | 590 | 580 |
| Moisture sensitivity | No foaming | No foaming |
| Pot life | 160 minutes | 155 minutes |
| Heat distortion temperature (° C.) | >75° C. | >75° C. |
| Impact resistance | Not punctured | Not punctured |
| Maximum exothermic peak (° C.) | 196 | 184 |
| Tensile modulus (MPa) | 2750 | 3350 |
| Tensile strength (MPa) | 72 | 84 |
| Tensile elongation at break (%) | 5 | 6 |

When comparing Comparative Example 6 with Example 10, it can be seen that the adhesive according to the present invention and the commercially available epoxy resin commonly used for fan blades are comparable in terms of the indexes of pot life and moisture sensitivity, but the adhesive according to the present invention has better bonding properties than the commonly used epoxy resin. Moreover, the maximum exothermic peak of the adhesive according to the present invention is lower than that of the epoxy resin, and the adhesive according to the present invention has a shorter post-curing time, reflecting that the production efficiency of the adhesive according to the present invention is higher than that of the epoxy resin.

It is apparent to those skilled in the art that the present invention is not limited to the specific details described above, and may be embodied in other specific forms without departing from the spirit or essential characteristics according to the present invention. The Examples are to be considered in all respects as illustrative but not restrictive, so that the scope according to the present invention is defined by the claims rather than the foregoing description. Thus, any change, as long as it belongs to the meaning and range of equivalents of the claims, should be considered as part of this invention.

The invention claimed is:

1. An adhesive, comprising the following components:
   a. a polyisocyanate having an isocyanate functionality of not less than 2;
   b. an epoxy-modified polyether polyol;
   c. a hydroxyl-containing acrylate;
   d. a redox catalyst;
   e. a silane coupling agent;
   f. optionally a polyol containing bisphenol A structure; and
   g. optionally a polymer polyol different from the epoxy-modified polyether polyol;

wherein the hydroxyl-containing acrylate conforms to the following general formula:

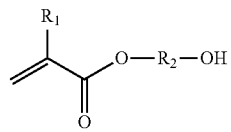

wherein $R_1$ is hydrogen or methyl or —$CH_2$—OH and $R_2$ is a saturated or unsaturated, linear or branched, aliphatic or cycloaliphatic divalent residue, having up to 18 carbon atoms, wherein said saturated or unsaturated, linear or branched, aliphatic or cycloaliphatic divalent residue, having up to 18 carbon atoms, can optionally comprise oxygen atoms and/or hydroxyl groups;
   and wherein the redox catalyst is one or more of the following: a peroxide, a persulfide, a peroxycarbonate, a peroxyboric acid, and an azide; the epoxy-modified polyether polyol is present in an amount of 50 wt % to 70 wt %, and the hydroxyl-containing acrylate is present in an amount of 25 wt % to 50 wt %, based on a sum of the weights of components b, c, f and g as 100 wt %.

2. The adhesive according to claim 1, wherein the hydroxyl-containing acrylate is one or more of the following: a hydroxyl-containing acrylic acid or methacrylic acid derivative, 3-hydroxypropyl ester, 2-hydroxypropyl ester, hydroxybutyl ester, polyvinyl alcohol monohydroxy ester, methyl hydroxy acrylate hydroxyalkyl ester, and polypropylene glycol monohydroxy ester.

3. The adhesive according to claim 1, wherein the hydroxyl-containing acrylate is present in an amount of 30 wt % to 50 wt %, based on the sum of the weights of the components b, c, f and g as 100 wt %.

4. The adhesive according to claim 1, wherein the redox catalyst is one or more of the following: benzoyl peroxide, tert-butyl peroxybenzoate, methyl ethyl ketone peroxide, and dicumyl peroxide.

5. The adhesive according to claim 1, wherein the silane coupling agent conforms to the general formula $XSi(OR_4)_3$, wherein X is one or more of the following: vinyl, γ-methacryloxypropyl, and γ-isocyanatopropyl; $R_4$ is one or more of the following: methyl and ethyl.

6. The adhesive according to claim 1, wherein the silane coupling agent is present in an amount of 0.5 wt % to 1.5 wt %, based on the a total amount of the adhesive as 100 wt %.

7. The adhesive according to claim 1, wherein a weight ratio of a sum of weights of the epoxy-modified polyether polyol and the optional polyether polyol different from the epoxy-modified polyether polyol to that of the polyisocyanate is from 0.4 to 1.2.

8. A method for producing an adhesive according to claim 1, comprising mixing in any manner the polyisocyanate having an isocyanate functionality of not less than 2 (a), the epoxy-modified polyether polyol (b), the hydroxyl-containing acrylate (c), the redox catalyst (d), the silane coupling agent (e), the optional polyol containing bisphenol A structure (f) and the optional polymer polyol different from the epoxy-modified polyether polyol (g) to obtain the adhesive; wherein the hydroxyl-containing acrylate conforms to the following general formula:

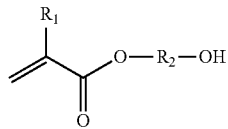

wherein $R_1$ is hydrogen or methyl or —$CH_2$—OH and $R_2$ is a saturated or unsaturated, linear or branched, aliphatic or cycloaliphatic divalent residue, having up to 18 carbon atoms, wherein said saturated or unsaturated, linear or branched, aliphatic or cycloaliphatic divalent residue, having up to 18 carbon atoms, can optionally comprise oxygen atoms and/or hydroxyl groups;
and wherein the redox catalyst is one or more of the following: a peroxide, a persulfide, a peroxycarbonate, a peroxyboric acid, and an azide; the epoxy-modified polyether polyol is present in an amount of 50 wt % to 70 wt %, and the hydroxyl-containing acrylate has is present in an amount of 25 wt % to 50 wt %, based on the sum of the weights of the components b, c, f and g as 100 wt %.

9. A bonded article comprising an adhesive according to claim 1.

10. A method for producing a bonded article, comprising:
  i. injecting an adhesive according to claim 1 into a cavity of a part to be bonded or coating it onto a substrate to be bonded; and
  ii. heating and curing the adhesive to obtain the bonded article.

11. The method according to claim 10, wherein the cavity of the part to be bonded or the substrate to be bonded is made of a glass fiber composite.

12. The method according to claim 10, wherein the bonded article is a fan blade or a sleeper.

13. The method according to claim 10, wherein the adhesive has a thickness of from 5 mm to 20 mm after heating and curing.

\* \* \* \* \*